: 2,750,358

2,750,358

POLYVINYL SULFONAMIDES AND PROCESS FOR PREPARING THE SAME

Harold F. Park, East Longmeadow, Mass., assignor to Monsanto Chemical Company, St. Louis, Mo., a corporation of Delaware No Drawing. Application March 6, 1953, Serial No. 340,928

3 Claims. (Cl. 260—79.3)

This invention relates to polyvinyl sulfonamides and to a novel method of preparing polyvinyl sulfonamides. More particularly, this invention relates to a novel method of preparing polyvinyl sulfonamide and N-substituted polyvinyl sulfonamides from polyvinyl chloride.

It has been recognized that the polyvinyl sulfonamides have many desirable properties and that they are useful in the preparation of soil additives, ion-exchange resins, fibers, adhesives, surface coatings, molding compositions, etc. However, the polyvinyl sulfonamides are generally prepared from their monomers only with great difficulty.

Accordingly, an object of the present invention is the preparation of polyvinyl sulfonamides.

Another object is the provision of a method of preparing polyvinyl sulfonamides from polyvinyl chloride.

These and other objects are attained by reacting polyvinyl chloride in suspension in a mixture of water and an organic swelling agent for the polyvinyl chloride with a water-soluble inorganic salt or sulfurous acid in order to obtain a polyvinyl sulfonate and then converting the polyvinyl sulfonate into a polyvinyl sulfonamide or an N-substituted polyvinyl sulfonamide.

The following examples are given in illustration and are not intended as limitations on the scope of this invention. Where parts are mentioned, they are parts by weight.

Example I

Into a suitable vessel fitted with a reflux condenser, place 100 parts of finely powdered polyvinyl chloride having an average molecular weight of about 60,000 as determined by the Staudinger equation, and add 4,000 parts of ethanol and 500 parts of distilled water. Heat the thus-formed suspension of polyvinyl chloride to reflux and add a solution of 160 parts ammonium sulfite in 500 parts of distilled water over a two hour period. Continue refluxing for another 72 hours and then cool and filter. Partially concentrate the filtrate by evaporation on a steam bath and then cool to room temperature. A precipitate of polyvinyl ammonium sulfonate forms. Recover the polymer by filtration, and dry. The thus-prepared polyvinyl ammonium sulfonate is a white powdery polymeric material that is soluble in water and substantially insoluble in alcohol, benzene and diethyl ether. Substantially all of the chlorine atoms originally present in the polyvinyl chloride are replaced by ammonium sulfonate radicals.

Mix 100 parts of polyvinyl ammonium sulfonate in the form of a white powder with 0.0001 part of sulfur under anhydrous conditions and cool the mixture to —20° C. with solid carbon dioxide. Add 100 parts of finely divided phosphorous pentoxide to the cold mixture and agitate at —20° C. for about 12 hours. Permit the mixture to warm to room temperature and then slowly add 50 parts of ice water in order to convert the remainder of the phosphorous pentoxide to phosphoric acid. Polyvinyl sulfonamide is only slightly soluble in ice water and, as a result, the product is a suspension of polyvinyl sulfonamide and sulfur in an aqueous solution of phosphoric acid. The polymer is recovered by filtration, the sulfur remaining with the polymer as a contaminant. The thus-prepared polyvinyl sulfonamide is soluble in warm water and in polar organic solvents such as dimethyl formamide but is insoluble in ordinary organic solvents such as benzene.

In preparing polyvinyl sulfonamide from polyvinyl chloride in accordance with this procedure, the polyvinyl chloride should be reacted with at least one mol of ammonium sulfite per mol of combined chlorine in the polyvinyl chloride in order to substantially completely convert the polyvinyl chloride to polyvinyl ammonium sulfonate. The polyvinyl ammonium sulfonate should be dehydrated in admixture with a small amount of sulfur or a phenol. If this is not done, the polyvinyl ammonium sulfonate may be converted into a tar rather than polyvinyl sulfonamide. The phenol may be a mono- or dicyclic, mono- or polyhydroxy, unsubstituted or alkyl or halogen substituted phenol, such as hydroquinone, tertiary butyl catechol, para-tertiary amyl phenol, resorcinol, catechol, phenol, etc. Most effective are the para-tertiary alkyl monohydric phenols, the dihydric phenols and the tertiary alkyl dihydric phenols. The amount of sulfur or phenol may be varied within the limits of from 0.0001 to 0.01 part per 100 parts of polyvinyl ammonium sulfonate.

When the dehydration reaction is to be carried out in a solid phase at relatively low temperatures (i. e. from —40° to 40° C.) a dehydration catalyst from the group consisting of phosphorous pentoxide or magnesium perchlorate should be used. At higher temperatures the reaction will be too vigorous in the presence of these catalysts and a tar will be formed. Metal oxide dehydrating catalysts of the class including aluminum oxide, thorium oxide, chromic oxide and tungsten pentoxide may be used at higher temperatures of from 80°–200° C. When a metal oxide catalyst is used at these temperatures a tar will not be formed. At temperatures above 200° C. decomposition will occur.

When a low temperature dehydration catalyst such as phosphorous pentoxide or magnesium perchlorate is used, the polymer is easily recovered by treating the reaction mixture with cold water in order to wash the dehydration catalyst from the polymer as in Example I. When a metal oxide dehydration catalyst is used, the polymer may be recovered by treating the reaction mixture with hot water, which will dissolve the polyvinyl sulfonamide, and then filtering the resulting suspension after which the polymer may be recovered by evaporating the filtrate.

According to another embodiment of the invention which is of broader applicability, a polyvinyl sulfonate is prepared by reacting polyvinyl chloride with a water-soluble inorganic salt of sulfurous acid. The polyvinyl sulfonate is reacted with one or more of a restricted class of compounds containing reactive chlorine, as hereinafter defined, in order to form polyvinyl sulfonyl chloride, and the polyvinyl sulfonyl chloride is reacted with ammonia or a primary or secondary amine in order to form polyvinyl sulfonamide or an N-substituted polyvinyl sulfonamide. The following examples are directed to this form of the invention.

Example II

Place 100 parts of finely powdered polyvinyl chloride having an average molecular weight of about 60,000 as determined by the Staudinger equation, 4,000 parts of ethanol and 500 parts of distilled water into a suitable vessel fitted with a reflux condenser. Heat the thus-formed suspension of polyvinyl chloride to reflux and add a solution of 200 parts of sodium sulfite in 500 parts of distilled water over a two hour period. Continue refluxing for another 72 hours and then cool and filter. Partially concentrate the filtrate by evaporation on a steam bath and then cool to room temperature. A gelatinous precipitate of polyvinyl sodium sulfonate forms. Recover the polymer by filtration and dry. The thus-prepared polyvinyl sodium sulfonate is a white powdery material which is soluble in water and substantially insoluble in alcohol, benzene and diethyl ether. Substantially all of the chlorine atoms originally present in the polyvinyl chloride are replaced by sodium sulfonate radicals.

Place an anhydrous mixture of 100 parts of the dry, powdered polyvinyl sodium sulfonate, 160 parts of powdered phosphorous pentachloride and 1 part of powdered phosphorous oxychloride in a suitable container and heat the mixture to 100° C. under anhydrous conditions. Continue the heating for another 6 hours, cool and then grind with a small amount of ice water until the reaction ceases. Solid polyvinyl sulfonyl chloride is formed as a result of this reaction. Recover the polyvinyl sulfonyl chloride by filtration, wash it with a small quantity of ice water and dry the washed product in an oven at 60° C.

Add 30 parts of anhydrous liquid ammonia to 100 parts of the dried polyvinyl sulfonyl chloride in a closed vessel in a Dry Ice bath in order to maintain the ammonia in a liquid condition and allow the two ingredients to react for about two hours under anhydrous conditions in order to form polyvinyl sulfonamide. Wash the polyvinyl sulfonamide with a small quantity of ice water and then dry in a vacuum oven. The polyvinyl sulfonamide prepared in this fashion is recovered in the form of a white powder that softens with charring at temperatures over 200° C. It is insoluble in ordinary organic solvents but is soluble in water and polar solvents such as dimethyl formamide. It may be reacted with formaldehyde to form methylol derivatives and may also be reacted with concentrated sodium hydroxide to form the sodium salt of polyvinyl sulfonamide.

In preparing the polyvinyl sulfonamides from polyvinyl chloride, other water-soluble inorganic salts of sulfurous acid may be reacted with the polyvinyl chloride to form the polyvinyl sulfonate. The polyvinyl sulfonate may be reacted with other members of the hereinafter defined class of compounds containing reactive chlorine in order to form polyvinyl sulfonyl chloride and the polyvinyl sulfonyl chloride, in addition to being reacted with ammonia to form polyvinyl sulfonamide, may also be reacted with a primary or secondary amine in order to form an N-substituted polyvinyl sulfonamide. This is illustrated by the following example.

*Example III*

In order to prepare polyvinyl potassium sulfonate, place in a suitable vessel fitted with a reflux condenser 4,000 parts of ethanol, 500 parts of distilled water and 100 parts of finely powdered polyvinyl chloride having an average molecular weight of about 60,000 as determined by the Staudinger equation. Heat the thus-formed suspension of polyvinyl chloride to reflux with stirring and then add a solution of 250 parts of potassium sulfite in 500 parts of distilled water over a two hour period. Continue refluxing for another 72 hours, cool and then filter. Partially concentrate the filtrate by evaporation on a steam bath and then cool to room temperature in order to obtain a precipitate of polyvinyl potassium sulfonate. Recover the polyvinyl potassium sulfonate by filtration and dry in a heated oven. The thus-prepared polyvinyl potassium sulfonate is obtained in the form of a white powdery material. It is soluble in water and substantially insoluble in ethyl alcohol. Substantially all of the chlorine atoms originally present in the polyvinyl chloride are replaced by potassium sulfonate radicals.

Place a mixture of 100 parts of the dried, powdered polyvinyl potassium sulfonate and 110 parts of phosphorous oxychloride in a suitable container under anhydrous conditions and react at a temperature of about 100° C. for about 6 hours in order to form polyvinyl sulfonyl chloride. Allow the mixture to cool and grind with a small amount of ice water at the end of this time in order to terminate the reaction. Remove the solid polyvinyl sulfonyl chloride by filtration, wash it with a small quantity of ice water and then dry it in an oven at 60° C. As a result of this reaction substantially all of the potassium sulfonate radicals are converted to sulfonyl chloride radicals.

In order to prepare polyvinyl N-octyl sulfonamide, mix 100 parts of the polyvinyl sulfonyl chloride in the form of a dry powder with 210 parts of anhydrous octyl amine and react the mixture in a suitable container under anhydrous conditions for about two hours at a temperature of about 0° C. Wash the polyvinyl N-octyl sulfonamide with a small quantity of ice water and dry in a vacuum oven. The thus-formed polyvinyl N-octyl sulfonamide is recovered in the form of a white powder. It is soluble in toluene, slightly soluble in alcohol and insoluble in water.

Water-soluble inorganic salts of sulfurous acid other than the potassium sulfite of the preceding example may be used in preparing the polyvinyl sulfonate. The water-soluble salts to be used in accordance with the present invention should be soluble in water to the extent of at least 0.1 part by weight of salt per 100 parts by weight of water. Among the salts that may be used are water-soluble alkali metal, alkaline earth metal, ammonium, etc., sulfites, bisulfites, etc., such as potassium sulfite, potassium bisulfite, sodium sulfite, sodium bisulfite, sodium hyposulfite, magnesium sulfite, calcium bisulfite, ammonium sulfite, ammonium bisulfite, etc. Mixtures of two or more of such water-soluble salts may be used if desired. At least one mol of salt per mol of combined chlorine in the polyvinyl chloride should be used in order to prevent the formation of crosslinked polymeric products and the reaction should be carried out in the presence of an amount of water sufficient to dissolve the salt. An excess of water may be used if desired. It is preferable, but not necessary, that the salt be in aqueous solution when added to the suspension of polyvinyl chloride and that the solution be added slowly.

Swelling agents for the polyvinyl chloride other than ethanol may be used with equally satisfactory results. The swelling agents are organic compounds that will either dissolve or swell polyvinyl chloride. When solvents for polyvinyl chloride are used, the presence of water in the reaction mixture will reduce the solubility of the polyvinyl chloride and the solvent will act as a swelling agent. Satisfactory swelling agents include water-soluble aliphatic alcohols such as methanol, ethanol, propanol, tertiary butyl alcohol, etc., dioxane, dimethyl formamide, methyl ethyl ketone, glycol ethyl ether, acetonylacetone, cyclohexanone, ethylene dichloride, mesityl oxide, etc. Mixtures of two or more such swelling agents may be used if desired.

For ease of reaction the polyvinyl chloride used as the starting material should preferably have an average molecular weight of from about 10,000 to 100,000 as determined by the Staudinger equation, although polyvinyl chloride having an average molecular weight above or below the indicated limits may be used if desired. In any event, the polyvinyl chloride should have an average molecular weight of at least 1,000.

The reaction between the polyvinyl chloride and the water-soluble inorganic salt of sulfurous acid is best carried out at reflux temperature but will proceed slowly even at room temperatures. Elevated temperatures of up to about 200° C. may be used if desired but the reaction is more difficult to control and suitable pressure vessels are required.

The reaction should be continued until the chlorine atoms of the polyvinyl chloride have been substantially completely replaced by sulfonate radicals. The extent of replacement can be readily determined by measuring either the viscosity of the solution or the amount of chlorine salt present therein. When an increase in viscosity or an increase in chlorine salt content is no longer detected the reaction is substantially complete.

In preparing polyvinyl sulfonyl chloride any of the polyvinyl sulfonates prepared by reacting polyvinyl chloride with a water-soluble inorganic salt of sulfurous acid, or mixtures of such sulfonates may be used. The phosphorous oxychloride of the preceding example may be replaced in whole or in part with other members of a restricted class of compounds which contain reactive chlorine. This restricted class of compounds consists of phosphorous trichloride, phosphorous pentachloride, phosophorous oxychloride, thionyl chloride and chlorosulfonic acid. A mixture of two or more such compounds may be used if desired. At least one mol of the compound per mol of combined sulfonate should be used and the reaction should be carried out under substantially anhydrous conditions. When the compound containing reactive chlorine is a compound other than phosphorous oxychloride, it is preferable to expedite the initiation of the reaction through the addition of a minor amount of phosphorous oxychloride as in the case of Example II. However, it is not absolutely necessary that this be done.

A reaction temperature of about 100° C. is preferably used when reacting the polyvinyl sulfonate with the compound containing reactive chlorine although the reaction will proceed at any temperature above 0° C. Higher temperatures of up to about 200° C. may also be used but the reaction is more difficult to control at such elevated temperatures.

Polyvinyl sulfonyl chloride hydrolyzes in water but the hydrolysis proceeds quite slowly in cold water. As a result, it is possible to purify this polymeric product by washing with a small quantity of ice water.

In order to prepare polyvinyl sulfonamide or an N-substituted polyvinyl sulfonamide, polyvinyl sulfonyl chloride is reacted, respectively, with ammonia or a primary or secondary amine. The primary and secondary amines may be alkyl, aryl, aralkyl, alicyclic or heterocyclic amines, it only being necessary that there be at least one reactive hydrogen atom attached to the nitrogen atom. Suitable amines of this character include dimethyl amine, ethyl amine, diethyl amine, propyl amine, dipropyl amine, aniline, diphenyl amine, tolyl amine, salicyl amine, phenyl ethyl amine, methyl tolyl amine, dodecylamine, ethylenimine, propylenimine, pyrrolidine, pyrrole, cyclohexylamine, etc. If desired, mixtures of two or more amines may be used.

The temperature to be used in reacting ammonia or a primary or secondary amine with the polyvinyl sulfonyl chloride may be varied as desired in order to react the polyvinyl sulfonyl chloride with the amino compound while the latter reactant is in a gaseous, liquid or solid state. Temperatures from as low as −100° C. and up to 200° C. may be used with satisfactory results. The reaction should be carried out under anhydrous conditions and at least two mols of ammonia or amine should be used for each mol of combined chlorine in order to substantially completely convert the polyvinyl sulfonyl chloride to the desired polyvinyl sulfonamide.

Some of the N-substituted polyvinyl sulfonamides are insoluble in water while polyvinyl sulfonamide and many of the N-substituted polyvinyl sulfonamides are soluble or partially soluble in warm water but only partially soluble in cold water. Accordingly, these polymers are easily purified when washed with ice water.

Polyvinyl sulfonamide and the N-substituted polyvinyl sulfonamides prepared in accordance with the present invention are not to be confused with the polyethylene or N-substituted polyethylene sulfonamides. In the case of the polyethylene sulfonamides, only a relatively small number of sulfonamide groups are present in the polymer and the groups are distributed at random in the polymer chain. The polyvinyl sulfonamides of the present invention, on the other hand, are obtained by replacing substantially all of the chlorine atoms of polyvinyl chloride with sulfonamide groups. Thus, for example, substantially all of the monomer units of the polyvinyl sulfonamide prepared in accordance with Examples I and II will have the structural formula

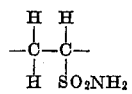

The various polymeric materials of the present invention may be compounded with conventional ingredients such as solvents, diluents, fillers, colorants, plasticizers, etc., in order to prepare compositions having a wide variety of physical properties and suitable for many uses such as the preparation of synthetic fibers, molding powders, ion-exchange resins, soil additives, adhesives, surface coatings, etc.

What is claimed is:

1. A process for preparing polyvinyl sulfonamide which comprises first forming polyvinyl ammonium sulfonate by reacting polyvinyl chloride in suspension in a mixture of water and a swelling agent for the polyvinyl chloride with at least one mol of ammonium sulfite per mol of combined chlorine in the polyvinyl chloride and then dehydrating said polyvinyl ammonium sulfonate at a polyvinyl sulfonamide-forming temperature in the presence of a dehydration catalyst taken from the group consisting of phosphorous pentoxide, magnesium perchlorate, aluminum oxide, thorium oxide, chromic oxide and tungsten pentoxide while said polyvinyl ammonium sulfonate is in admixture with a minor amount of a compound taken from the group consisting of sulfur, mono- and dicyclic, mono- and polyhydroxy, unsubstituted, alkyl and halogen-substituted phenols.

2. A process as in claim 1 wherein the dehydration catalyst is phosphorous pentoxide, wherein the compound is sulfur and wherein the polyvinyl ammonium sulfonate is dehydrated at a temperature of −40 to +40° C.

3. A process for preparing polyvinyl ammonium sulfonate which comprises reacting polyvinyl chloride in suspension in a mixture of water and a swelling agent for the polyvinyl chloride with at least 1 mol of ammonium sulfite per mol of combined chlorine in the polyvinyl chloride.

References Cited in the file of this patent
UNITED STATES PATENTS

| | | |
|---|---|---|
| 2,300,920 | Heuer | Nov. 3, 1942 |
| 2,324,896 | Zerweck | July 20, 1943 |

FOREIGN PATENTS

| | | |
|---|---|---|
| 623,422 | Great Britain | May 17, 1949 |

OTHER REFERENCES

Whitmore: "Organic Chemistry," pages 165–167, Van Nostrand (1937).

Norris: "Experimental Organic Chemistry," pages 151, 152, McGraw-Hill (1933).